US008607441B1

(12) United States Patent
Hurst et al.

(10) Patent No.: US 8,607,441 B1
(45) Date of Patent: Dec. 17, 2013

(54) BAR MOUNTED TOOL ADAPTOR

(75) Inventors: Rick Hurst, Rochester Hills, MI (US);
Corey Chappus, Armada, MI (US);
Bryan Voss, Warren, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 152 days.

(21) Appl. No.: 13/245,244

(22) Filed: Sep. 26, 2011

Related U.S. Application Data

(63) Continuation of application No. 12/823,385, filed on Jun. 25, 2010, now Pat. No. 8,024,852, which is a continuation of application No. 11/248,074, filed on Oct. 12, 2005, now Pat. No. 7,748,107.

(60) Provisional application No. 60/617,969, filed on Oct. 12, 2004.

(51) Int. Cl.
*B23P 21/00* (2006.01)
*B65G 1/133* (2006.01)

(52) U.S. Cl.
USPC .................................. 29/721; 414/752.1

(58) Field of Classification Search
USPC ............ 29/469, 559, 721, 700, 281.1, 281.4, 29/281.5, 281.6, 283, 743; 414/752.1, 414/749, 749.1, 751.1; 294/65; 901/16
See application file for complete search history.

(56) References Cited

U.S. PATENT DOCUMENTS 6,190,395 B1 * 2/2001 Williams ...................... 606/130
6,244,814 B1 * 6/2001 Herbermann et al. ..... 414/752.1

* cited by examiner

*Primary Examiner* — John C Hong
(74) *Attorney, Agent, or Firm* — Young Basile Hanlon & MacFarlane P.C.

(57) ABSTRACT

A tool mounting system having at least one support tool structure with at least one tool connected to each of the at least one tool support. A first and second mounting portion is connected to each of the at least one tool support structure and is connectable to a first and second mount on a base, respectively. The first and second mounting portions have particular mounting characteristics for each of the at least one support tool structure such that the first and second mounting portions are only correspondable to the first and second mounts of the base to ensure the proper position of the at least one tool support structure relative to the base.

19 Claims, 3 Drawing Sheets

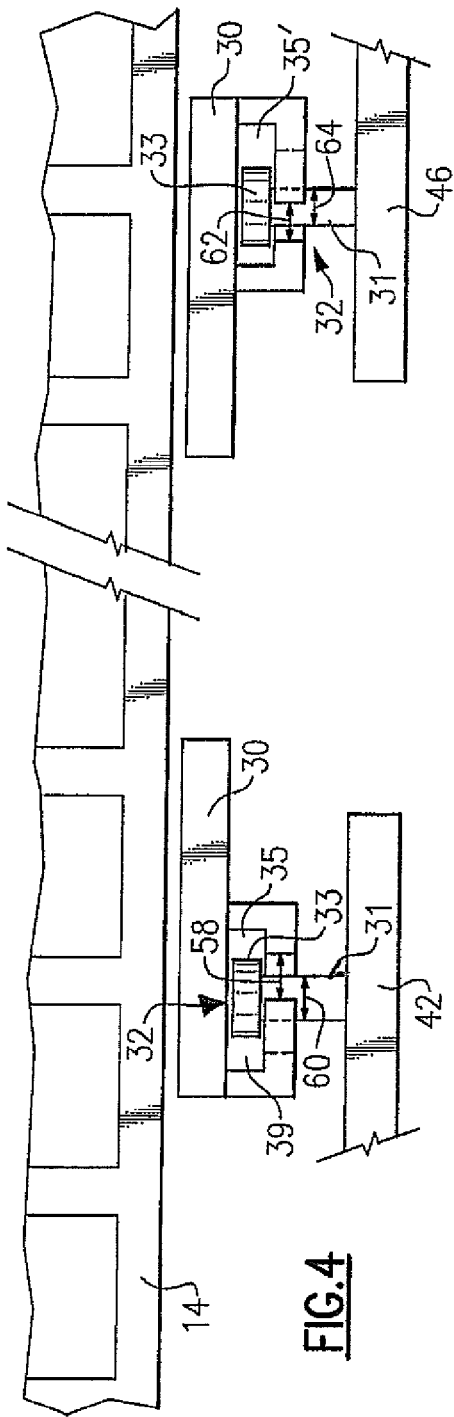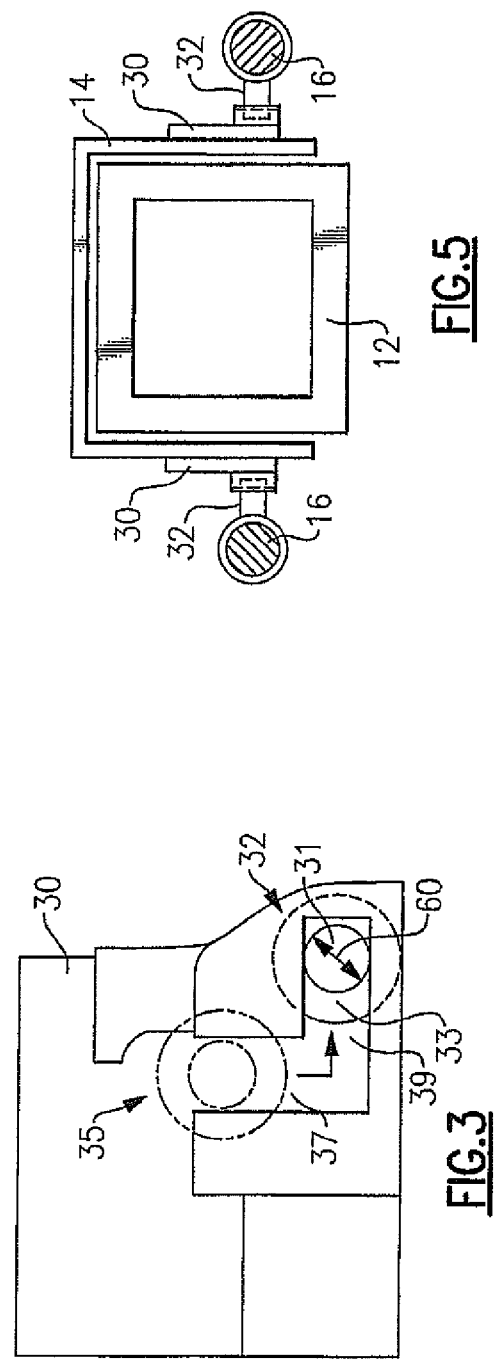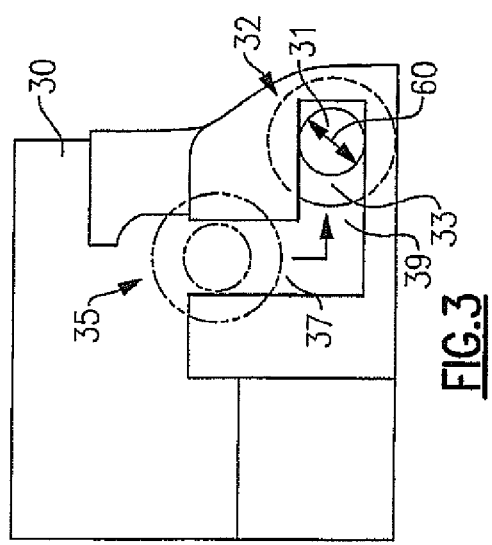

BAR MOUNTED TOOL ADAPTOR

REFERENCE TO RELATED APPLICATIONS

The application is a continuation application of U.S. patent application Ser. No. 12/823,385, filed on Jun. 25, 2010, which was a continuation application of U.S. patent application Ser. No. 11/248,074, which issued as U.S. Pat. No. 7,748,107, and which claims the priority of U.S. Provisional Patent Application Ser. No. 60/617,969, filed on Oct. 12, 2004.

BACKGROUND OF THE INVENTION

This invention generally relates to a tool mounting system for a workpiece transfer system. More particularly, this invention relates to a tool mounting system mountable to a workpiece transfer system.

A workpiece transfer system includes a bar that moves a workpiece between desired locations. Often the workpiece transfer system will move body panels between stamping stations. Tools such as grippers or vacuum cups are attached to the bar and grasp a workpiece at one location and release the workpiece at another location. The tools often utilize pressurized air for actuation and therefore need numerous pneumatic couplings and conduits that are attached to the bar.

In many applications of workpiece transfer systems, the clearance between the bar and the stamping station is limited. Accordingly, each part must fit within certain defined space restrictions. This includes the pneumatic and electrical wires that supply and control actuation of the gripper and vacuum tools.

Further, it is often the case with many transfer systems that multiple workpiece configurations are fabricated within the same line. The stamping dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY OF THE INVENTION

A tool mounting system of the present invention provides at least one tool support structure having at least one tool mounted on each of said at least one tool support structure. A first and second mounting portion is connected to each of the at least one tool support structure and is connectable to a first and second mount on a base, respectively. The first and second mounting portions have particular mounting characteristics for each of the at least one support tool structure such that the first and second mounting portions are only correspondable to the first and second mounts of the base to ensure for the proper position of the at least one tool support structure.

The mounting characteristics of the first and second mounting portions may comprise the first and second mounting portions being spaced along each of the at least one tool support structure at predetermined unique distances that are only correspondable to the first and second mounts of the base. The mounting characteristics may also comprise the first and second mounting portions of each of the at least one tool support structure being uniquely color-coded and correspondable with a common color-coding on the first and second mounts of the base. The mounting characteristics may also comprise the lug having a substantially cylindrical shaft connected to the tool support structure and a bushing connected to the end of the cylindrical shaft. The cylindrical shaft of the lug of the second mounting portion has a predetermined diameter that is only correspondable with a slot in the second mount of the base.

The tool support structure of the tool mounting system may include an elongated, substantially cylindrical rail. A mounting arm may be adjustably connected to the tool support structure and have at least one tool connected to the mounting arm. The tool may include a vacuum cup and/or a sensor for sensing the presence of a workpiece.

BRIEF DESCRIPTION OF THE DRAWINGS

FIG. 3 is a schematic view of an example lug mount according to this invention.

FIG. 4 is a top schematic view of example drop down lug mounts according to this invention.

FIG. 5 is a cross-sectional view of the example tool mounting system.

DETAILED DESCRIPTION OF THE PREFERRED EMBODIMENT

Figure 1:
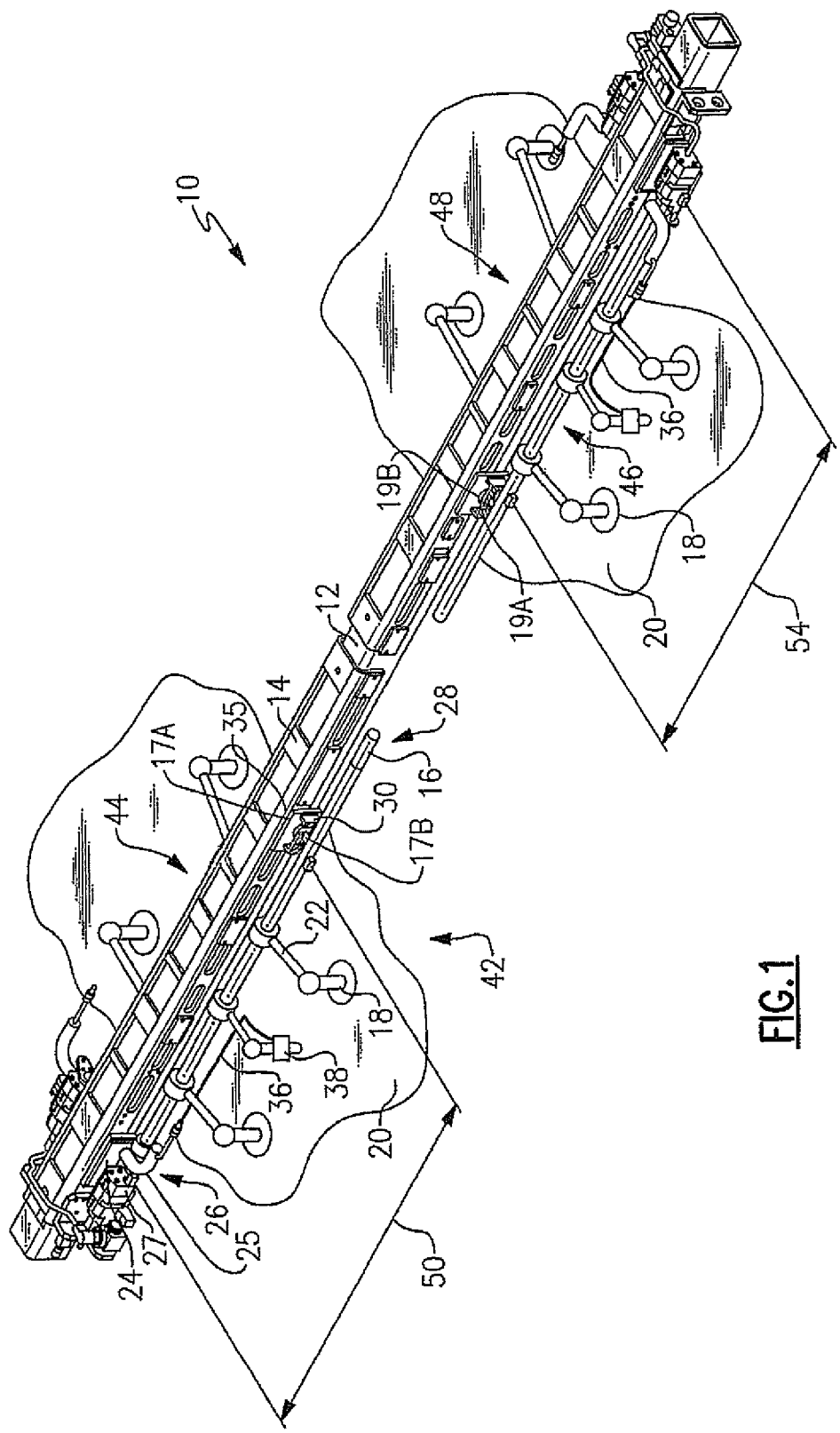
FIG. 1 is a perspective view of an example bar tool mounting system according to this invention.

Referring to FIG. 1, workpiece transfer system 10 includes a bar 12 that moves a workpiece 20 between workstations (not shown). An adaptor 14 is attached to the bar 12 and supports the tools 18. The tools 18 extend from removable rails 16 attached to the adaptor 14. The tools 18 illustrated are pneumatically actuated suction cups. However, other tools as are known would also benefit from the disclosures of this invention, for example mechanical grippers and part present sending devices.

The rail 16 is part of a rail assembly. There are four rail assemblies 42, 44, 46 and 48 illustrated. The tools 18 are mounted to arms 22 that are in turn mounted to the rail 16 of each rail assembly 42, 44, 46 and 48. The position of the tools 18 along the rail 16 is infinitely adjustable such that the configuration and placement of the tools 18 can be tailored to the requirements of a specific application and workpiece 20.

Each of the rail assemblies 42, 44, 46 and 48 include a mount plug 25 that is attachable to a selectively releasable mount connector 24 attached to the adaptor 14. The mount plug 25 is affixed to a first end of the rail 16 for each of the rail assemblies 42, 44, 46 and 48. The mount plug 25 interfaces with the mount connector 24 to communicate pressurized air and provide an electrical connection for any electrical devices mounted to the rail 16. The mount connector 24 includes a locking device 27 movable between a released position where the rail 16 may be removed and a secured position where the rail 16 is rigidly held into the mount connector 24, and the desired electrical and pneumatic connections are completed.

The example rail assembly 42 includes a sensor 38 for detecting the presence of the workpiece 20. The sensor 38 is electrically attached through the interface between the mount plug 25 and the mount connector 24. The mount connector 24 is in turn in communication with a source of electrical energy and pressurized air. Further, the mount connector 24 is adaptable for providing communication of control signals to the tools 18 mounted to the rail 16.

The mount connector 24 also provides support of an end of the rail 16. The second end 28 of the rail 16 is supported by a lug 32 that fits within a lug mount 30. The lug 32 on the rail 16 is first placed within the lug mount 30 and slid axially into full engagement with the mount connector 24. The lug mount 30 receives the lug 32 within a slot 35 that includes a vertical portion 37 and horizontal portion 39. The lug 32 drops within the vertical portion 37 of the slot 35 and is slid axially within the horizontal portion 39 of the slot 35 to facilitate axial engagement and securement of the mount plug 25 within the mount connector 24. Although a mount connector 24 and mount plug 25 are illustrated, it is within the contemplation of this invention to utilize other mounting devices that are known in the art.

The rail assemblies 42, 44, 46 and 48 are installed to the adaptor 14 in a specific location. Each of the rail assemblies 42, 44, 46 and 48 are adapted to fit only one location to ensure a desired orientation of the rail assemblies 42, 44, 46 and 48 to comply with application specific requirements. Each of the rail assemblies 42, 44, 46 and 48 is identified by a color code. The color of the lug 32 corresponds to a color on the lug mount 30 to provide a determination of the correct position for mounting of the rail assembly.

The color code in the illustrated example is green for the rail assembly 42 and is indicated schematically by shading 17B on the rail assembly 42 and shading 17A on the lug mount 30. The rail assembly 46 includes a gold color code schematically indicated at 19A on the rail 16 and a matching gold color indicated at 19B on the lug mount 30. The rail assembly 44 includes a silver color code (not shown) and the rail assembly 46 includes a black color code (not shown). The color-codes 17A and 19A disposed on the rail 16 of each rail assembly 42, 46 comprise a colored tape. The color-codes 17B and 19B on the lug mounts 30 are provided by a desired plating color. As appreciated, other colors and methods of adhering that color to the lug mount and the rail may be utilized to identify each position on the adaptor 14 with the corresponding one of the rail assemblies 42, 44, 46 and 48. The different color codes provide for easy identification of the proper location for the rail assembly.

Figure 2:
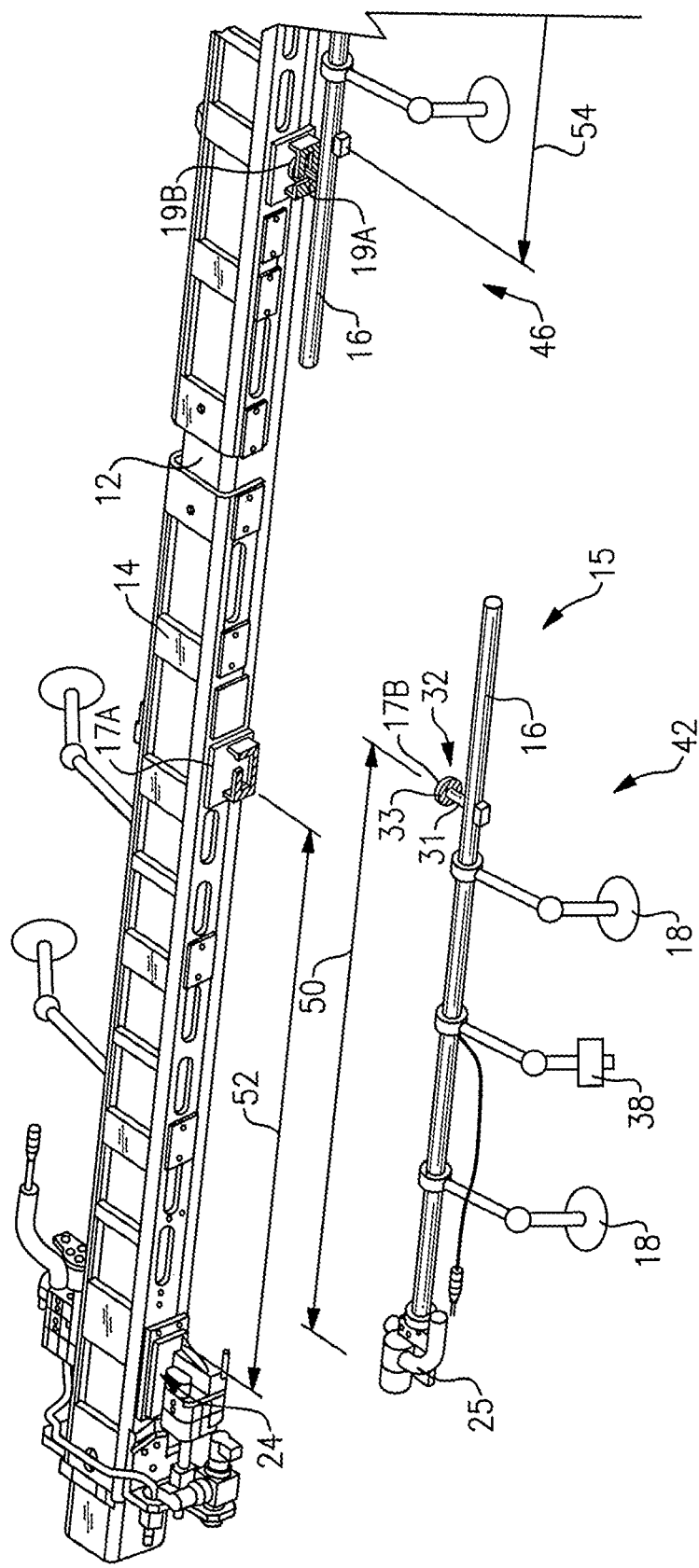
FIG. 2 is another perspective view of the example bar tool mounting system with a rail removed.

Referring to FIG. 2, the rail assembly 42 is illustrated removed from the rail adaptor 14. The rail assembly 42, like the other rail assemblies 44, 46 and 48 includes a length 50 between the lug 32 and a portion of the mount plug 25. The length 50 for each of the rail assemblies in unique such that one rail assembly cannot be assembled into the place of another rail assembly. In the example illustrated in FIG. 2, the rail assembly 46 includes a length 54 that is different than the length 50 such that the rail assembly 46 cannot be assembled in place of the rail assembly 42. The length 50 between the lug 32 and the end of the mount plug 25 corresponds to a length 52 between the mount connector 24 and the lug mount 30. The length 52 is measured from a stop of the mount connector 24 and a position within the horizontal portion 39 of the slot 35 within the lug mount 30.

The length 50 between the lug 32 and the end of the mount plug 25 is a dimension that is fabricated within desired tolerances to provide the desired fit once mounted. As appreciated, some prior art tool mounting devices include multiple critical dimensions that must be closely controlled to provide the desired fit, or event to allow assembly. The instant tool mounting system includes only a single closely held dimension, thereby simplifying assembly, and fabrication.

The rail assembly 42 is easily removable by unlocking the mount plug 25 from the mount connector 24 and moving the entire rail axially away from the mount plug 25 until the lug 32 is free to move vertically within the slot 35 of the lug mount 30. Another rail assembly including tooling for a differently shaped and configured workpiece can then be installed to provide a relatively quick and easy tooling change over.

In operation, several sets of rail assemblies will be provided that correspond to various and differently configured workpieces. Change over is conducted by removing one set of color-coded rail assemblies and installing another set in the proper color code locations. Rail assemblies can only be properly installed into corresponding locations due to the different lengths 50 and 54 between the mount connector 24 and the lug mount 30.

Referring to FIG. 3, the lug mount 30 is shown without the rail and adaptor for clarity. The lug mount 30 includes the slot 35 having the vertical portion 37 and the horizontal portion 39. The drop down feature provided by the lug 32 being received in the slot 35 facilitates quick assembly of a rail assembly. The lug 32 includes a bushing 33 that supports the tool and prevents twisting during installation. The drop down feature thereby prevents twisting of the rail assembly during assembly, thereby substantially eliminating the need for an assembler to support the rail assembly during the entire assembly process.

Referring to FIG. 4, the lug mounts 30 are shown schematically that correspond to mounting arrangements for the rail assembly 42 and the rail assembly 46. The slot 35 includes a width 58 for the lug 32. The lug 32 includes the bushing 33 supported on a shaft 31. The shaft 31 includes a diameter 60 that corresponds with the width 58 that provides for assembly of the lug 32 within the slot 35. The width 58 is tailored to each of the rail assemblies 42, 44, 46 and 48 such that each of the rail assemblies 42, 44, 46 and 48 includes a tailored width 58 unique to that particular rail assembly.

Accordingly, the rail assembly 46 is partially shown with the lug 32 having a shaft 31 of a diameter 64 different than the diameter 60 for the rail assembly 42. The lug mount 30 for the rail assembly 46 includes a width 62 of the slot 35' that prevents another rail assembly, such as, for example, the rail assembly 42 from being installed within the lug mount 30 instead of the rail assembly 46. Accordingly, the different diameters for each shaft 31 of each of the rail assemblies 42, 44, 46 and 48 substantially prevent assembly of a rail assembly in a non-desired orientation.

Referring to FIG. 5, a cross-section of the transfer system 10 is shown with the adaptor 14 attached to the bar 12. As appreciated, the transfer system 10 operates within a space-restricted environment. In some applications, it is desired to limit or eliminate mounting of devices or objects to the top of the bar 12. Such applications may not allow the mounting of electrical wire harnesses and air lines to the top surface of the bar 12. In such applications, the instant adaptor 14 provides the necessary mounting and communication of air and electric to the tooling without extending substantially beyond the top surface of the bar 12. The addition of the adaptor 14 adds only the minimal thickness of the adaptor 14 to the overall height of the bar 12.

Accordingly, the inventive workpiece transfer system 10 includes several features that assure proper configuration of the several rail assemblies 42, 44, 46 and 48 that expedite and facilitate quick tool changeover. Different lengths between mounting points for each rail assembly and tailored diameters of shafts for each lug accompanied by color-coded parts provides for fail safe and efficient tool change over. Further, the drop down mounting provided by the lug and lug mount tool mount configuration eases mounting by eliminating awkward and difficult maneuvering of the rail assemblies during the mounting process.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tool mounting system, comprising:
a plurality of support tool structures having at least one tool mounted on each of said plurality of tool support structures;
a first and second mounting portion connected to each of said plurality of tool support structures and connectable to a corresponding first and second mount on a base, respectively; and
said first and second mounting portions having particular mounting characteristics for each of said plurality of support tool structures such that said first and second mounting portions are only correspondable to said first and second mounts of said base to ensure for the proper location of said plurality of tool support structures.

2. The tool mounting system stated in claim 1, wherein said mounting characteristics further comprise:
said first and second mounting portions of each of said plurality of tool support structures spaced along each of said plurality of tool support structures at predetermined, unique distances that are only correspondable to said corresponding first and second mounts of said base.

3. The tool mounting system stated in claim 1, wherein said mounting characteristics further comprise:
said first and second mounting portions of each of said plurality of tool support structures being uniquely color-coded and correspondable with a common color-coding on said corresponding first and second mounts of said base.

4. The tool mounting system stated in claim 1, wherein said tool support structure further comprises:
an elongated, substantially cylindrical rail.

5. The tool mounting system stated in claim 1, further comprising:
a mounting arm adjustably connected to said tool support structure and having said at least one tool connected to said mounting arm.

6. The tool mounting system stated in claim 5, wherein said at least one tool comprises:
a vacuum cup.

7. The tool mounting system stated in claim 5, wherein said at least one tool comprises:
a sensor for sensing the presence of a workpiece.

8. A tool mounting system, comprising:
at least one support tool structure having at least one tool mounted on each of said at least one tool support structure;
a first and second mounting portion connected to each of said at least one tool support structure and connectable to a first and second mount on a base, respectively;
said first and second mounting portions having particular mounting characteristics for each of said at least one support tool structure such that said first and second mounting portions are only correspondable to said first and second mounts of said base to ensure for the proper position of said at least one tool support structure; and
a mount plug connectable to said first mount of said base, and said mount plug having at least one pressurized air, electrical, and electronic control connections connectable to said first mount of said base.

9. A tool mounting system, comprising:
at least one support tool structure having at least one tool mounted on each of said at least one tool support structure;
a first and second mounting portion connected to each of said at least one tool support structure and connectable to a first and second mount on a base, respectively;
said first and second mounting portions having particular mounting characteristics for each of said at least one support tool structure such that said first and second mounting portions are only correspondable to said first and second mounts of said base to ensure for the proper position of said at least one tool support structure; and
a lug connectable to said second mount of said base.

10. The tool mounting system stated in claim 9, wherein said mounting characteristics further comprise:
said lug having a substantially cylindrical shaft connected to said tool support structure, and a bushing connected to an end of said cylindrical shaft; and
said cylindrical shaft of said lug of said second mounting portion having a predetermined diameter that is only correspondable to a slot in said second mount of said base.

11. A tool rail assembly, comprising:
an elongated rail having at least one tool connected to said elongated rail;
a mount plug connected to one end of said elongated rail;
a lug connected to said elongated rail and spaced from said mount plug along said elongated rail; and
said mount plug and said lug having mounting characteristics that allow said elongated rail to be releasably connectable to a particular first and second mount connected to a base to ensure for the proper positioning of said elongated rail.

12. The tool rail assembly stated in claim 11, wherein said elongated rail further comprises:
a substantially cylindrical, rigid rod.

13. The tool rail assembly stated in claim 11, wherein said mounting characteristics further comprise:
said mount plug and said lug spaced at a predetermined distance along said elongated rail such that said mount plug and said lug are only connectable to said particular first and second mount on said base.

14. The tool rail assembly stated in claim 11, wherein said mounting characteristics further comprise:
said lug shaded a particular color, wherein said color of said lug is correspondable with said second mount on said base having a similar shaded color.

15. The tool rail assembly stated in claim 11, wherein said mounting characteristics further comprise:
said lug having a substantially cylindrical shaft connected to said elongated rail with a bushing connected to the end of said shaft;
said shaft of said lug having a predetermined diameter that is only correspondable with a slot in said second mount on said base.

16. The tool rail assembly stated in claim 11, further comprising:
said mount plug having at least one pressurized air, electrical, and electronic control connections that are engageable with said first mount on said base to supply said at least one pressurized air, electricity, and electronic controls to said at least one tool.

17. The tool rail assembly stated in claim 11, further comprising:
a mounting arm adjustably connected to said elongated rail, and one of said at least one tool connected to said arm.

18. The tool rail assembly stated in claim 11, wherein said tool further comprises:
a vacuum cup.

19. The tool rail assembly stated in claim 11, wherein said tool further comprises:
 a sensor for sending the presence of a workpiece.

\* \* \* \* \*